United States Patent [19]

Wolf

[11] Patent Number: 4,877,476

[45] Date of Patent: Oct. 31, 1989

[54] PROCESS OF MAKING A RESIN-COMPOSITE PANEL

[75] Inventor: Jerry M. Wolf, Westerville, Ohio

[73] Assignee: Midwest Acoust-A-Fiber, Inc., Ostrander, Ohio

[21] Appl. No.: 267,281

[22] Filed: Nov. 4, 1988

[51] Int. Cl.⁴ .............................................. B32B 31/20
[52] U.S. Cl. ............................. 156/307.3; 156/309.6;
156/307.7; 428/284; 428/285; 428/343;
428/354; 52/309.13
[58] Field of Search ................ 156/309.6, 307.3, 62.2,
156/307.7; 428/354, 285, 286, 351, 920, 352;
181/291; 52/309.13

[56] References Cited

U.S. PATENT DOCUMENTS

| | | | |
|---|---|---|---|
| 3,905,855 | 9/1975 | Blewett et al. | 428/285 X |
| 3,955,031 | 5/1976 | Jones et al. | 156/309.6 X |
| 4,249,976 | 2/1981 | Hudson | 156/286 |
| 4,265,957 | 5/1981 | Severance et al. | 428/285 X |
| 4,353,947 | 10/1982 | Northcutt | 156/290 X |
| 4,496,024 | 1/1985 | Wolf et al. | 156/290 X |
| 4,569,884 | 2/1986 | Weinand et al. | 428/286 X |
| 4,594,278 | 6/1986 | Nixon | 181/291 X |
| 4,778,547 | 10/1988 | Becker et al. | 156/209 X |

Primary Examiner—Robert A. Dawson
Assistant Examiner—Michele K. Yoder
Attorney, Agent, or Firm—Sidney W. Millard

[57] ABSTRACT

The invention relates to a method of fabricating a fiberglass-resin impregnated composite article which has a non porous surface formed by melting and curing a suitable polymeric film thereon. The process further involves coating an adhesive layer having a release sheet thereon over the non-porous melted polymer surface for bonding onto a substrate, and the invention further relates to the particular formed article and a process of forming an air-conditioning frame.

11 Claims, 1 Drawing Sheet

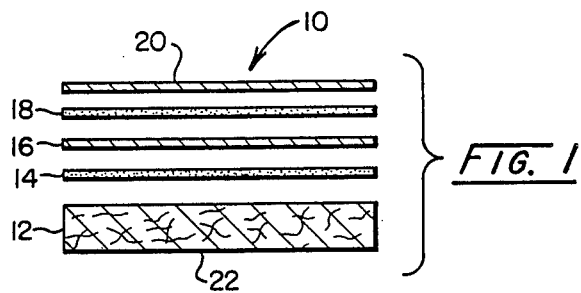
FIG. 1
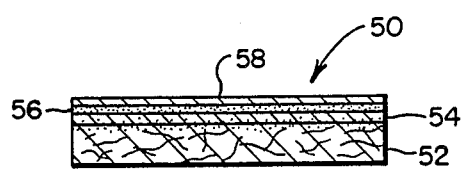
FIG. 2
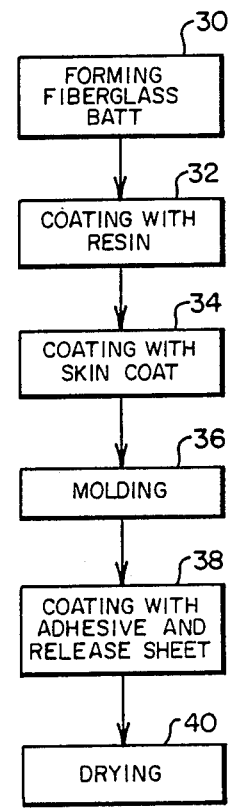
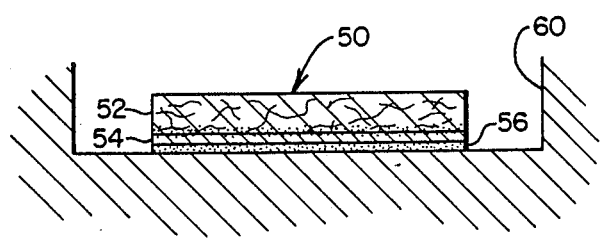
FIG. 3
FIG. 4

PROCESS OF MAKING A RESIN-COMPOSITE PANEL

FIELD OF THE INVENTION

The invention relates to a method of making a resin fiberglass composite which is particularly useful as a panel in construction applications such as in an air-conditioning frame, a process of making the composite, and the fabricated composite article.

BACKGROUND OF THE INVENTION

A variety of building materials which utilize fiberglass resin composites have been made for a multitude of construction purposes. Additionally, the use of polymeric materials as layers in construction materials, panels, and the like is also well known. The resultant articles exhibit a wide variety of different properties depending upon the particular characteristics of the fiberglass fiber, resin utilized, and polymeric material incorporated therein.

Such articles are particularly useful in articles such as air-conditioning structures where the thermal and moisture resistant characteristics of resin-fiberglass composites are particularly essential. Such composites are excellent insulators, as well as being strong, lightweight materials and therefore their use has attracted a great deal of attention in the art. However, these composites are hampered by several problems, such as being non-porous so that liquid gradually permeates within and damages the article. Additionally, bonding such composite articles into structures in an efficient and effective manner has also been a problem, since such materials require suitable adhesives to be coated thereon and must be protected from the environment until they are placed in a position of intended use.

Accordingly, there is a need to develop a panel useful in articles such as an air-conditioning frame and the like for purposes relating to enhanced thermal and moisture treatment characteristics and also in other related construction environments. There is also a need to develop an accompanying method of making such panels so a suitable fiberglass panel can be constructed from fiberglass materials and resins, be made sufficiently non-porous on at least one outer surface and have an effective adhesive bonded to an outer surface for utilization at the desired time.

SUMMARY OF THE INVENTION

The invention comprises, in a first aspect, a method of making an air conditioning frame having an insulating article bonded thereon, which is particularly adaptable for utilization in the construction of air conditioners, e.g., as a bulk head insulator for a conditioning frame and, in a broader embodiment, is also useful in a variety of other articles. This involves the steps of coating a resin-impregnated, partially cured (B-stage cured) fiberglass batt formed, e.g., into a planar batt, on a first surface with a layer of compatible resin having a sufficiently high viscosity so that during later processing and molding the resin will not seep entirely through the composite. The batt is preferably made from flame attenuated fiberglass of specific dimensions and it is preferred to use phenolic type resin binders. The coated resin on the surface must be compatible with the resin-fiberglass composite. Next, a thin, non-woven polymeric sheet is applied onto the cured resin layer, on top of the uncured resin, and the resultant article is then molded under elevated temperatures and pressures for a suitable time to cure the article and also so that the polymeric sheet melts and forms a mechanical bond with the fibers at the surface of the resin fiberglass article, i.e., forms a non-porous zone at the surface. The resultant article is then removed from the mold and later a suitable adhesive, e.g., preferably a high solids content water based adhesive, is coated over the surface having the melted polymeric layer thereon. Preferably this layer is then coated with a release sheet such as a poly coated kraft paper sheet and the resultant article is then preferably dried to remove any moisture present therein.

In a second aspect the invention comprises a method of making a resin impregnated fiberglass product having an outer surface which is substantially non-porous, in which essentially the same procedure as set forth above is followed. It is preferred that the resin-fiberglass batt is formed by impregnating flame attenuated glass fibers having suitable ranges of length and diameter and then blending the fibers with a suitable binder resin, followed by forming and compressing the resulting mixture into a partially cured, i.e., B-stage cured resin impregnated fiberglass batt. The process is conducted as before, although the resultant article is not utilized as an air conditioning panel.

In yet another aspect, the invention comprises a molded resin-fiberglass article having at least a first surface which is substantially non-porous and over which an adhesive layer for adherence to a desired substrate is coated. The article comprises a base layer of a compressed resin-impregnated fiberglass batt having a thin zone adjacent the surface in which the melted polymer has penetrated the surface fibers of the fiberglass batt to form a mechanical bond, with a suitable adhesive layer for attachment to a substrate coated over this non-porous surface of the fiber glass batt. Preferably, a release sheet is positioned over the adhesive.

BRIEF DESCRIPTION OF DRAWINGS

The best mode contemplated in carrying out this invention is illustrated and better understood by reference to the following detailed description when considered together with the accompanying drawings, in which:

FIG. 1 is an exploded view of a structural sandwich for making the composite laminated article according to the invention.

FIG. 2 discloses a block diagram outline of a preferred process for making the composite articles of the invention.

FIG. 3 discloses the resultant laminated structure of the article of FIG. 1 after being fabricated by the process set forth in FIG. 2 of the invention.

FIG. 4 discloses the laminated structure of FIG. 3 bonded to the inside of an air conditioning frame.

DESCRIPTION OF THE PREFERRED EMBODIMENT

With reference to the drawings, FIG. 1 discloses the particular layers which are formed according to the process of FIG. 2 to produce the article set forth in FIG. 3.

The structural sandwich 10 comprises a resin-impregnated fiberglass batt 12 as a base layer which is formed and partially cured, i.e., cured to the B-stage at either the immediate locale or at a different site. It is particularly preferred to use a flame attenuated glass fiber attainable from Manville, Inc. under the trade name "Microlite uncured" or, alternatively, "Rotary uuncured" which has a fiber length ranging from ¾ to about 2 inches, preferably 1 to 1¾ inch, and a fiber diameter ranging from about 7.0 to 13 microns, preferably about 3.8 to 5.1 microns, although for other applications a variety of different glass fibers may be used. The fiberglass batt is formed in conventional fashion, with the fibers being placed in a mold and sprayed in the bed with a suitable resin binder, preferably a phenolic resin, i.e., a phenol-phenolic, or phenol-formaldehyde resin such as the acid catalyzed, water soluble phenolic formaldehyde resin sold by Georgia Pacific, or the like. Preferably, the resulting fiberglass batts should comprise about 13 to 20 wt % resin, most preferably 16 to 18 wt %, with the remainder being glass fibers. The resulting composite can have a density ranging from about 2 to 18 lbs./ft$^3$, most preferably from about 4 to 6 lbs./ft$^3$. After mixing, the resulting article is processed into a batt as set forth in block 30 of FIG. 2, i.e., the batt is compressed and partially cured (B-staged cured) so that the resulting article has the desired width and thickness.

The second stage of the process, as indicated in block 32, involves coating the layer 12 on a first, preferably planar surface by known techniques with an uncured resin layer 14, which is a resin compatible with the binder resin of the fiberglass-resin article 12. Most preferably, the resin layer 14 is the same resin as that used in the fiber resin layer 12, i.e., preferably a phenol-phenolic resin, although in the broadest embodiment any suitable binder resin which is compatible with the resin forming the fiberglass article layer 12 can be utilized as layer 14. It is essential that the resin have a high enough viscosity so that upon application it will not permeate through the entire width of the fiberglass resin layer 12 before molding and final cure. Layer 12 can have a variety of thicknesses, but it is typically preferred to have the thickness range from about 1/32 to 1 inch in dimension. It is also preferred that the coated resin layer 14 seep into the fiberglass layer 12 to a depth of about 1/16 to 1/32 of an inch and in this immediate area the resin content ranges, preferably, from about 22 to 24 wt % of the fiberglass resin composite.

Next, the process involves step 34 of coating the resultant article with a skin coat 16, which is a porous polymeric sheet of preferably non-woven character. This sheet is preferably chosen from polymeric films such as polyesters, polyamides such as nylons, acrylics, and mixtures of the above. The skin coat or polymeric sheet should be applied in amounts ranging from about 0.5 to 10 ounces per square yard, most preferably about 0.5 to 4.5 ounces per square yard. It is an essential element of the process that sheet 16 must melt and flow into the interstices of the surface fiberglass and bond thereto, so as to form a thin surface coating which is partially water impermeable, but will allow water to evaporate through the coating. It is most preferred to use polyesters and nylons such as sold under the trade names of "Remey" by Dupont, "812 PES" by Fiber Dynamics, Inc. or "Lutrador 7230, 7240 and 7250" sold by Lutravil as the skin coat 16.

The resultant article, comprising layers 12, 14 and 16, is next molded to a desired thickness and shape, preferably about ⅛ to 1 inch total thickness, at elevated temperatures and pressures. Preferably, temperatures ranging from about 350° to 550° F. can be utilized. Most preferably it is preferred to operate at temperatures of 375° to 475° F. at pressure ranges in the mold between 20 to 4000 psi to produce the molded, cured article. Typically this involves molding times ranging from about 1 to 5 minutes, preferably about 2 to 3½ minutes. During molding as mentioned above, the polymeric skin coat 16 melts and forms a mechanical bond with the fibers at the immediate surface of fiber resin article 12, and also the resin in both fiberglass batt 12 and layer 14 are completely cured during forming the laminated article in step 36.

Upon completion of molding step 36, the cured article is removed from the mold and after cooling, coated with a bonding adhesive in step 38, preferably with a release sheet 20 lightly adhered over the adhesive layer 18. Adhesive layer 18 is preferably any of a variety of suitable high solids content water based adhesives which can securely adhere to the molded fiberglass article and bond it onto a desired substrate for secure, long-term use. It is preferred to use a water-base adhesive having a solids content of at least 30 wt % and preferably 48 to 65 wt %. Most preferably, it is preferred to utilize a water-based adhesive sold under the trade name "FW-627" which is commercially available from Franklin International, Columbus, Ohio. The composition of FW-627 is as follows:

|  | % BY WEIGHT |
| --- | --- |
| VM & P Napththa | 2–3% |
| Toluene | 2–3% |
| Antioxidant | 0.1–0.5% |
| C9 Hydrocarbon Resin | 5–10% |
| C5/C9 Hydrocarbon Resin | 5–10% |
| Zinc Rosinate | 2–5% |
| Cellulosic Thickener | 0.5–1.5% |
| Aliphatic Oil | 5–15% |
| Amorphous Silica | 10–15% |
| Defoamer | 0.1–0.5% |
| Ammonium Hydroxide | 0.05–0.15% |
| Water | 40–50% |
| Styrene-Butadiene Latex | 5–15% |
| Weight per gallon = 8.8 pounds | |
| Percent Non-Volatiles = 45.5% | |

Adhesive layer 18 can be coated onto the molded article by any of a variety of methods known to the art such as roller, knife, or spray bonding. Additionally, it is preferred to protect the adhesive layer by utilization of a suitable poly coated kraft sheet 20 such as that sold by Ludlow, Inc. of Ware, Mass., which is a 60 to 90 lb weight, poly coated kraft paper which is substantially moisture impermeable and is easily removed from the resultant article 10 at the desired time of use.

Upon completion of bonding it is preferred to dry in step 40 the formed article 50 until all of the moisture dissipates out of the porous side of the article, i.e., the side not bonded by the adhesive layer 18 and release sheet 20. However, the formed article 10 is capable of moderate vapor permeation through the untreated side 22 of the fiberglass layer 12. It is preferred to utilize infra red heaters for about 2 to 5 minutes at a temperature of about 350° to 400° F. Upon completion of the drying step 40 the article is then cut to desired blocks and shapes and can be utilized in a variety of construction-type applications preferably being bonded to a substrate which performs a significant temperature dividing function such as that found in an air conditioning panel.

FIG. 3 discloses the formed article 50, which first includes layer 52 that is formed of fiberglass and cured in a resin matrix according to the precise specifications set forth earlier. The upper section of layer 52 is a thin, bonded zone 54 in which the non-woven polymer sheet 16 has been melted and the resin binder layer 14 cured so as to form a thin, planar zone which is non-porous and contains the melted polymeric component mechanically bonded to the fibers in this resin concentrated area. On top of layer 54 a thin adhesive layer 56 is bonded to the molded article and release sheet 58 is bonded to layer 56.

FIG. 4 discloses one preferred use of the formed article in which article 50 has had its release sheet 58 removed so that the now surface adhesive layer 56 can be bonded to a desired substrate, such as, e.g., the inside of an air-conditioning panel 60.

It is additionally to be appreciated that although the invention has been described in terms of making a single unit, these blocks can be laminated to each other in varying lamination arrangements, as would be clear to one skilled in the art. Additionally, although it is preferred to produce a substantially rectangular array of planar blocks, it is to be understood that a multiplicity of surface arrangements can be so utilized if desired. Additionally, it should also be appreciated that such a panel can be utilized for a multitude of different applications besides the ones indicated above and a variety of different fiberglass materials, binder resins, polymeric skin coats, adhesive laminating layers and release sheets can be so utilized in the invention. Also, in like fashion the resultant process of fabrication can be modified in a manner apparent to one skilled in the art.

From the foregoing description, one skilled in the art can easily ascertain the essential characteristics of this invention, and without departing from the spirit and scope thereof, can make various changes and modifications of the invention to adapt it to various usages and conditions.

I claim:

1. A method of making an air conditioning frame having an insulating article thereon, comprising
    coating a resin impregnated, partially cured fiberglass batt on a first surface with a layer of compatible resin;
    applying a porous non-woven polymeric sheet onto the coated resin layer to form an article;
    forming and curing the article at elevated temperature and pressure wherein the polymeric sheet melts and forms a non-porous coating on the first surface of the cured article;
    coating a layer of effective adhesive on the first surface having the non-porous coating;
    bonding the article in a desired location to an air conditioning frame.

2. A method in accordance with claim 1 wherein the adhesive is a high solids content adhesive.

3. A method in accordance with claim 1 wherein the resin-fiberglass batt comprises about 13 to 20 wt % phenolic resin and has a density of about 2 to 18 lbs./ft$^3$.

4. A method in accordance with claim 3 wherein the layer of compatible resin is a phenolic resin less than about ⅛ inch thick and has a viscosity insufficient for passing through the fiberglass batt before forming.

5. A method in accordance with claim 1 wherein the polymeric sheet is selected from non-woven polyesters, polyamides, acrylics and mixtures thereof.

6. A method in accordance with claim 1 wherein the forming temperature ranges from about 350° to 550° F. for a time of about 1 to 4 minutes.

7. A method in accordance with claim 1 wherein the article forms a substantially planar sheet having a thickness of about ⅛ to 1 inch.

8. A method according to claim 1 wherein the melted polymeric sheet bonds to the fibers of the fiberglass batt in the immediate surface area.

9. A method in accordance with claim 2 wherein the adhesive exhibits a solids content of 40-65 wt %.

10. A method in accordance with claim 8 wherein the adhesive comprises:

|  | % BY WEIGHT |
| --- | --- |
| VM & P Napththa | 2-3% |
| Toluene | 2-3% |
| Antioxidant | 0.1-0.5% |
| C9 Hydrocarbon Resin | 5-10% |
| C5/C9 Hydrocarbon Resin | 5-10% |
| Zinc Rosinate | 2-5% |
| Cellulosic Thickener | 0.5-1.5% |
| Aliphatic Oil | 5-15% |
| Amorphous Silica | 10-15% |
| Defoamer | 0.1-0.5% |
| Ammonium Hydroxide | 0.05-0.15% |
| Water | 40-50% |
| Styrene-Butadiene Latex | 5-15% |
| Weight per gallon = 8.8 pounds | |
| Percent Non-Volatiles = 45.5% | |

11. A method of making a resin impregnated fiberglass product, comprising
    impregnating flame attenuated glass fibers with a binder resin and forming the resulting mixture into a plurality cured resin impregnated fiberglass batt;
    coating the fiberglass batt on a first surface with a layer of compatible resin
    applying a porous, non-woven polymeric sheet onto the coated resin layer to form an article; forming and curing the article at elevated temperature and pressure wherein the polymeric sheet melts and forms a non-porous coating on the first surface of the cured article;
    coating a layer of adhesive on the first surface having the non-porous coating;
    applying a non-porous release sheet to the adhesive layer and curing the article at elevated temperature.

* * * * *